(12) United States Patent
Matsuyama et al.

(10) Patent No.: US 11,407,368 B2
(45) Date of Patent: Aug. 9, 2022

(54) WIRE PROTECTION MEMBER

(71) Applicant: SUMITOMO WIRING SYSTEMS, LTD., Yokkaichi (JP)

(72) Inventors: Hiroki Matsuyama, Yokkaichi (JP); Yuji Tanaka, Yokkaichi (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 611 days.

(21) Appl. No.: 16/476,994

(22) PCT Filed: Jan. 12, 2018

(86) PCT No.: PCT/JP2018/000591
§ 371 (c)(1),
(2) Date: Jul. 10, 2019

(87) PCT Pub. No.: WO2018/135392
PCT Pub. Date: Jul. 26, 2018

(65) Prior Publication Data
US 2019/0351846 A1    Nov. 21, 2019

(30) Foreign Application Priority Data

Jan. 19, 2017    (JP) ............................. JP2017-007168

(51) Int. Cl.
*B60R 16/02*    (2006.01)
*F16L 3/10*    (2006.01)
*H02G 3/04*    (2006.01)

(52) U.S. Cl.
CPC ........ *B60R 16/0215* (2013.01); *F16L 3/1025* (2013.01); *F16L 3/1091* (2013.01); *H02G 3/0418* (2013.01); *H02G 3/0481* (2013.01)

(58) Field of Classification Search
CPC .. B60R 16/0215; F16L 3/1025; F16L 3/1091; H02G 3/0418; H02G 3/0481; H02G 3/0487; H02G 3/34; H02G 3/383
(Continued)

(56) References Cited

U.S. PATENT DOCUMENTS 4,140,367 A * 2/1979 Makuch ............... G02B 6/3869
385/59
4,688,833 A * 8/1987 Todd ................... F16L 25/0045
285/361
(Continued)

FOREIGN PATENT DOCUMENTS

JP    2009-143326 A    7/2009
JP    2011-30358 A    2/2011
(Continued)

OTHER PUBLICATIONS

Feb. 13, 2018 International Search Report issued in International Patent Application No. PCT/JP2018/000591.
(Continued)

*Primary Examiner* — Timothy J Thompson
*Assistant Examiner* — Michael F McAllister
(74) *Attorney, Agent, or Firm* — Oliff PLC

(57) ABSTRACT

A wire protection member includes a pipe and a protector that define a routing pathway of a wire. The protector has a body part and a cover part that are connected to each other in a direction perpendicular to an axial direction of the pipe and cover an end part of the pipe. A protector-side locking part is provided at at least one of the body part or the cover part. At the pipe, a pipe-side locking part is provided that (i) when the body part and the cover part are connected, fits together with the protector-side locking part from the direction intersecting the axial direction and (ii) restricts posi-
(Continued)

tional deviation of the protector in a circumferential direction of the pipe and in the axial direction of the pipe.

9 Claims, 19 Drawing Sheets

(58) Field of Classification Search
USPC ........................................... 174/72 A
See application file for complete search history.

(56) References Cited

U.S. PATENT DOCUMENTS

| | | | | |
|---|---|---|---|---|
| 4,940,424 A | * | 7/1990 | Odbert | H01R 13/6392 439/367 |
| 5,394,494 A | * | 2/1995 | Jennings | G02B 6/3834 385/59 |
| 2003/0183413 A1 | * | 10/2003 | Kato | B60R 16/0215 174/135 |
| 2004/0033711 A1 | * | 2/2004 | Loveless | H01R 24/50 439/314 |
| 2009/0301758 A1 | * | 12/2009 | Suzuki | H02G 3/0475 174/135 |
| 2018/0241185 A1 | | 8/2018 | Ueno et al. | |

FOREIGN PATENT DOCUMENTS

| | | |
|---|---|---|
| JP | 2012-089300 A | 5/2012 |
| JP | 2015-089143 A | 5/2015 |
| JP | 2016-149860 A | 8/2016 |

OTHER PUBLICATIONS

Apr. 24, 2018 International Preliminary Report on Patentability issued in International Patent Application No. PCT/JP2018/000591.

* cited by examiner

WIRE PROTECTION MEMBER

This invention relates to a wire protection member.

BACKGROUND

Japanese Published Patent Application 2015-89143 discloses a wire protection member, as an exterior material that protects a wire inserted therein, including (i) a corrugated tube and (ii) a metal pipe having a connecting part (a) inserted into an end part of the corrugated tube and (b) connected to the corrugated tube. A corrugated tube is a tubular member having a bellows structure in which concave parts and convex parts are alternately aligned in an axial direction.

At an end part of a pipe, a plurality of convex parts for connection are aligned and arranged in the axial direction, which engage with concave parts on an inner peripheral surface at the end part of the corrugated tube. By having the convex parts for connection engage with the concave parts, the corrugated tube and the pipe are connected.

SUMMARY

Incidentally, if it is desired that a routing pathway of a wire is defined to be fixed, instead of a flexible member such as a corrugated tube, a protector that keeps the same shape may be connected to an end part of a pipe. However, in a protector, the concave parts that are present in a corrugated tube are not originally present. Furthermore, it is difficult for a pipe to have a substantially complex structure; thus, it is difficult to build a structure that stably connects the protector to the pipe.

Based on the above situation, this invention is achieved. An object of this invention is to ensure reliability when connecting a protector to a pipe.

A feature of this invention is a wire protection member having a wire inserted therein and including a pipe and a protector that define a routing pathway of the wire, wherein:

the protector has a body part and a cover part that are connected to each other from a vertical direction perpendicular to an axial direction of the pipe, and cover an end part of the pipe, and a protector-side locking part is provided at at least one of the body part and the cover part, and at the pipe, a pipe-side locking part is provided that (i) when the body part and the cover part are connected, fits together with the protector-side locking part from a direction intersecting the axial direction, and (ii) restricts positional deviation of the protector in a circumferential direction of the pipe and in the axial direction of the pipe. The pipe-side locking part is a hole that penetrates through a peripheral wall of the pipe, the protector-side locking part is a protrusion that fits in the hole, the protrusion is fittingly inserted into the hole from the vertical direction, and the end part of the pipe is held between the body part and the cover part.

The protector has the body part and the cover part, the wire is caused to be arranged along the body part, and in that state, the cover part can be connected to the body part. Thus, there is no need for an operation that inserts a wire into the inside of the protector, and assembly workability is excellent. When the cover part is connected to the body part, the protector-side locking part is fit to the pipe-side locking part from a direction intersecting the axial direction, the protector is maintained to be restricted from positional deviation in the circumferential direction and in the axial direction with respect to the pipe. Thus, there is no need to arrange a special complex connecting structure at the pipe or the protector as a positional deviation restriction means, and the protector can be reliably connected to the pipe.

DETAILED DESCRIPTION OF EMBODIMENTS

Figure 1:
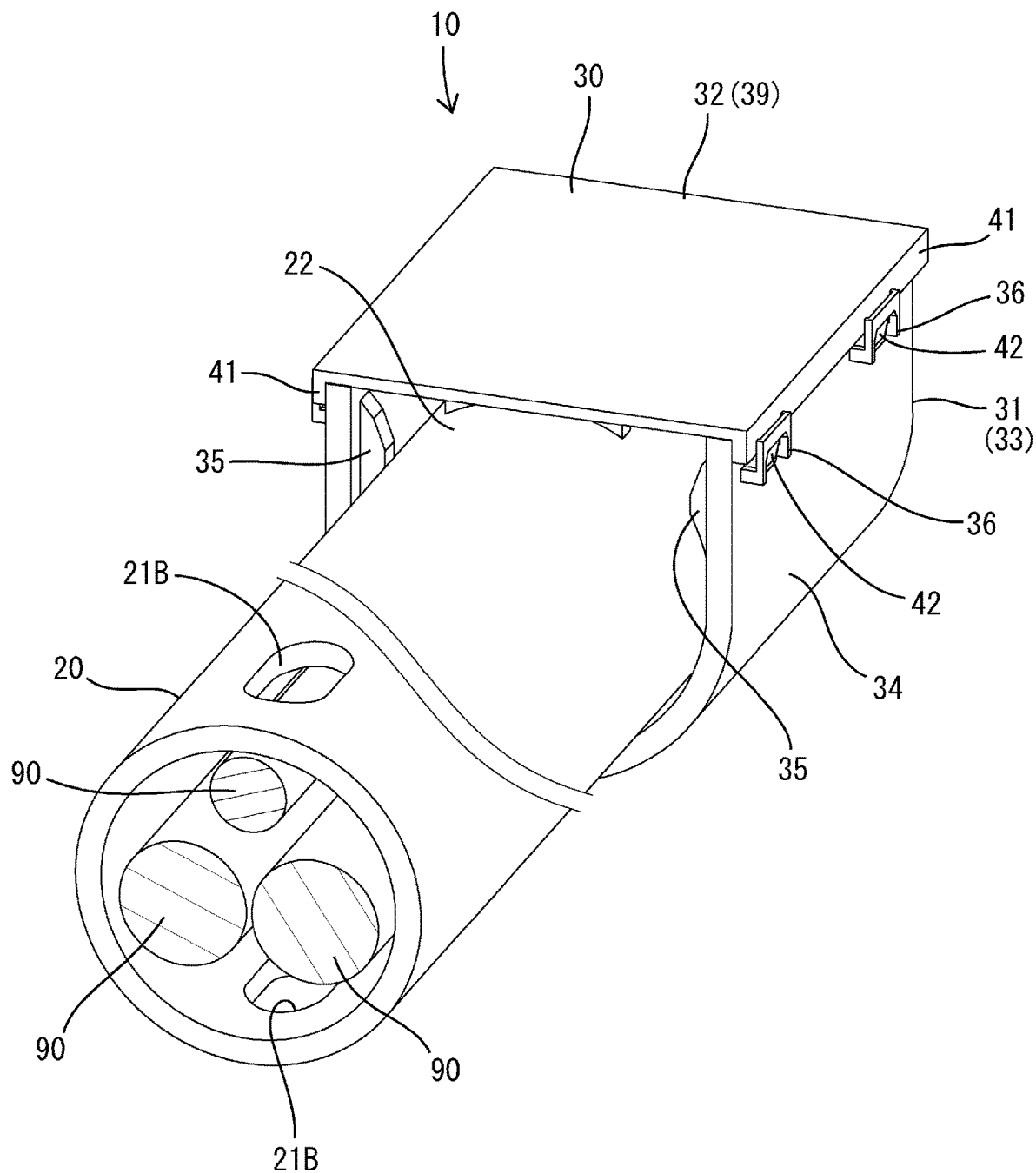
FIG. 1 is a perspective view of main parts of a wire protection member of embodiment 1 of this invention.

The following shows preferred embodiments of this invention.

The pipe may be an extrusion molded body made of resin. In the case of this invention, a pipe-side locking part(s) is formed from an extrusion molded pipe without any problem as long as the pipe-side locking part is fit together with respect to a protector-side locking part(s).

The protector-side locking parts may be arranged at both of the body part and the cover part. According to this, the protector may be stably and reliably connected to the pipe.

At both ends, in an axial direction of a wrapping part that covers an end part of the pipe, the protector is provided with locking parts that hold the body part and the cover part in a connected state. According to this, even if an external force acts on the protector that is connected to the pipe, and a large stress is applied to the both end parts of the wrapping part of the protector in the axial direction, the locking parts are present at the both ends in the axial direction, whereby positional deviation of the protector with respect to the pipe can be effectively restricted.

(i) The hole(s) may be arranged at both end parts of the pipe in the axial direction, and (ii) one of the holes arranged at the both ends in the axial direction may be formed in an elongated hole shape elongated in the axial direction, allowing the protrusion to be loosely fit in the axial direction. When the protector is respectively connected to both end parts of the pipe in the axial direction, if there is an assembly error between the protector and the pipe in the axial direction, the protrusions that are the protector-side locking parts may not be fit in the holes that are the pipe-side locking parts. Thus, according to this structure, if the hole at one side has an elongated hole shape in which the protrusion can be loosely fit in the axial direction, the protrusions can be reliably fit in the respective holes arranged at both ends in the axial direction.

The protector may be installed at a surface under a floor of a vehicle, and the cover part may be flat and be arranged along the surface under the floor. According to this, the protector can be stably installed at the surface under the floor of the vehicle, and a large wire insertion space can be ensured which is formed inside of the protector.

Embodiment 1

Based on FIGS. 1-11, the following explains embodiment 1. A wire protection member 10 of embodiment 1 is installed at a surface under a floor of an undepicted vehicle, is a member that (i) defines a routing pathway of a wire 90 and (ii) protects the wire 90, and is provided with a pipe 20 and a protector 30.

Figure 11:
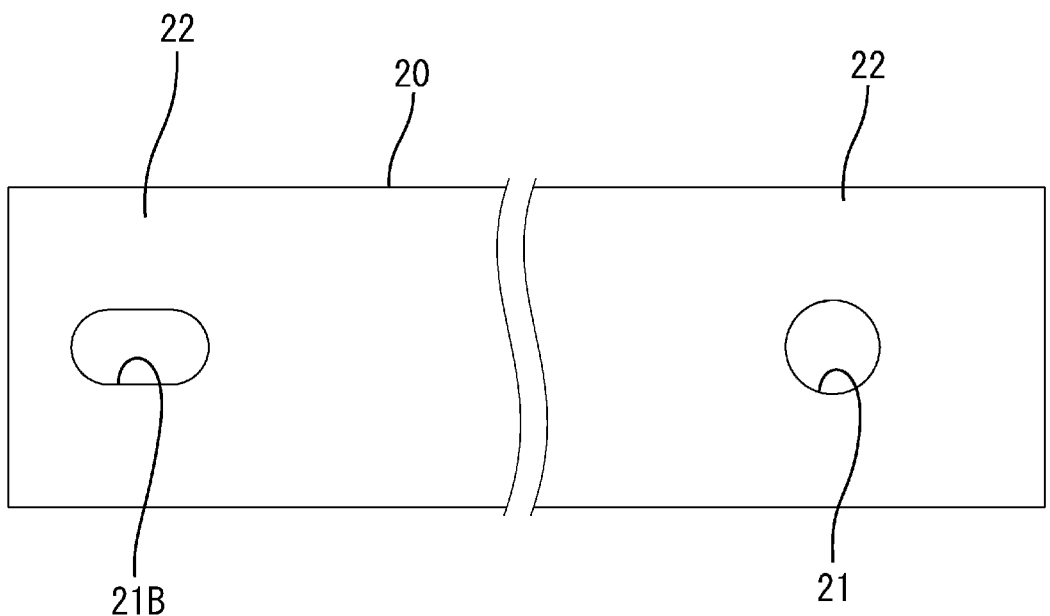
FIG. 11 is a plan view of main parts of a pipe of embodiment 1 of this invention.
Figure 12:
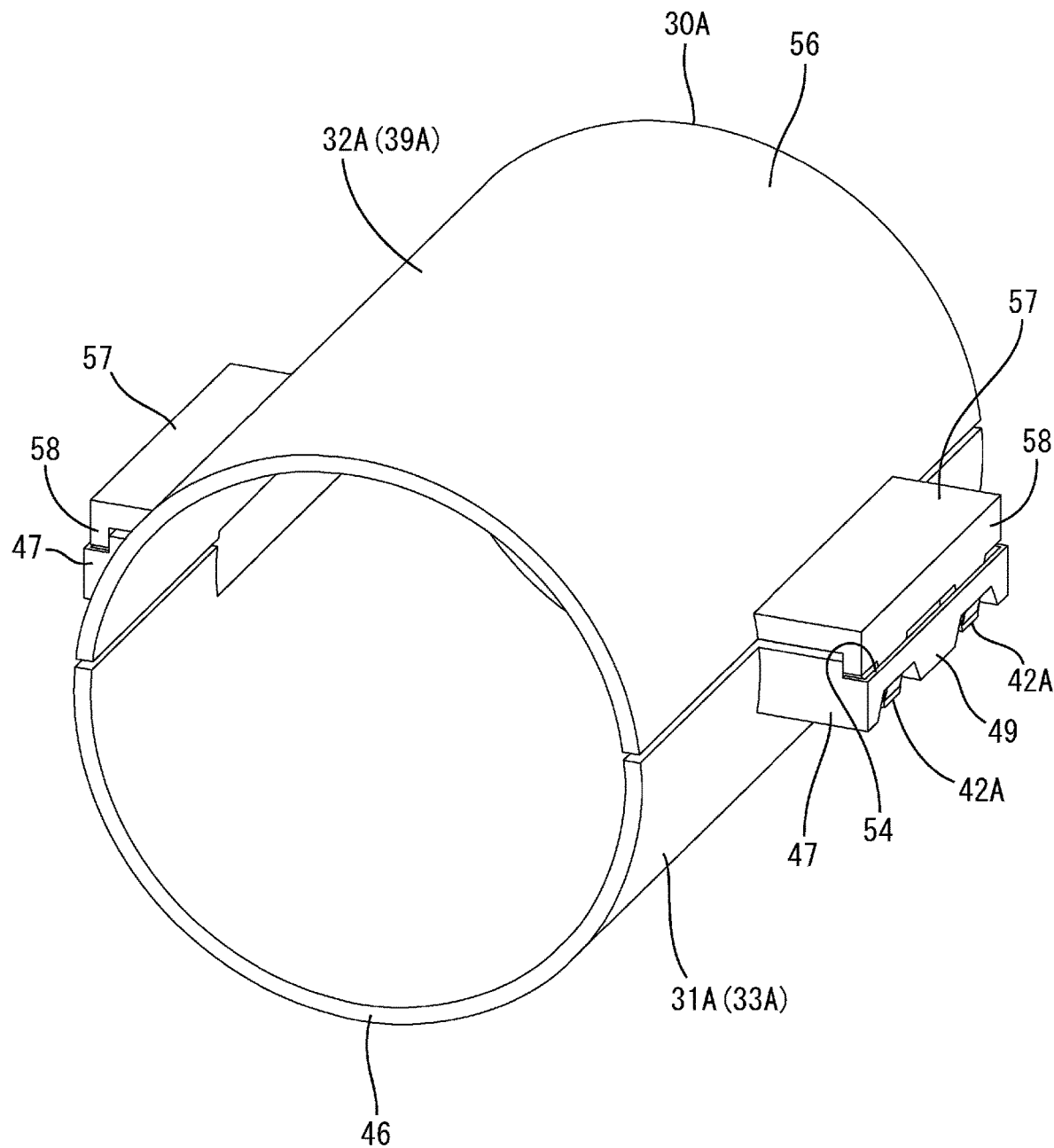
FIG. 12 is a perspective view of main parts of a protector of a wire protection member of a reference example.

The pipe 20 is made of synthetic resin and is configured to be a straight tubular extrusion molded body. Specifically, the pipe 20 elongatedly extends in a front/rear direction along the surface under the floor of the vehicle and is configured as a resin pipe that holds a fixed shape. As shown in FIG. 11, at respective end parts of the pipe 20 in the axial direction (front/rear direction), holes 21 and 21B are penetratingly arranged as pipe-side locking parts. The holes 21 and 21B are through holes, each of which is cross-sectionally circular and coaxially penetrates through upper and lower end parts of peripheral walls of the pipe 20 in a diameter direction, and are formed by drilling the extrusion molded pipe 20. Among the holes 21 and 21B arranged at the respective ends in the axial direction, the hole 21B positioned at one end is cross-sectionally oval, being long in the axial direction, and the hole 21 positioned at the other end is perfectly circular in a cross section. Additionally, hereafter "the hole" refers to the hole 21 that is perfectly circular in cross section unless otherwise specified.

As shown in FIG. 1, a plurality of wires 90 is inserted through the pipe 20. Each wire 90 is a coated wire in which an outer periphery of a core wire is surrounded by an insulation coating, and the plurality of wires is composed of a plurality of types having different diameters. Additionally, respective end parts of the pipe 20 in the axial direction are wrapping areas 22 that overlap the protectors 30 covering the outside.

The protectors 30 are made of synthetic resin, are each constituted by a body part 31 and a cover part 32, and are respectively connected to the wrapping areas 22 at both end parts of the pipe 20 in the axial direction. The body parts 31 and the cover parts 32 are combined with each other from a vertical direction that becomes a direction perpendicular to the axial direction of the pipe 20. Furthermore, in the drawings, a body-side wrapping part 33 and a cover-side wrapping part 39 are mainly shown, which will be explained later, and the protectors 30 are not entirely shown. The entire protectors 30 are three-dimensionally bent and are each provided with an undepicted mounting part attachable to the surface under the floor of the vehicle.

Figure 5:
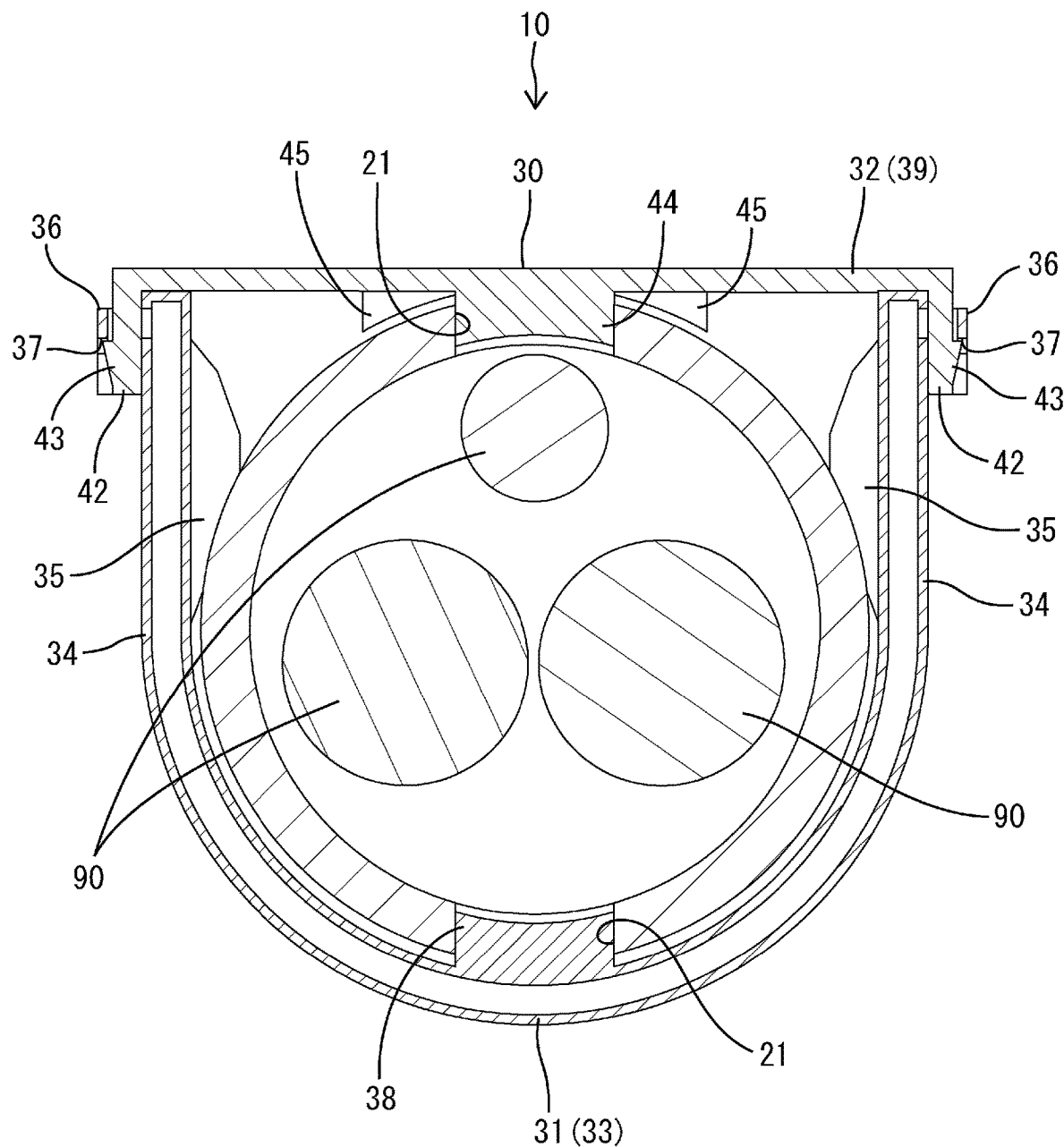
FIG. 5 is a cross-sectional view taken along line Y-Y of FIG. 3.

As shown in FIG. 5, each body part 31 has a hollow body-side wrapping part 33 that is U-shaped in a cross section and can cover the wrapping area 22 of the pipe 20 from below and both sides. A lower half part of the body-side wrapping part 33 is formed in a semicircular arc shape along the lower half part of the pipe 20.

Figure 9:
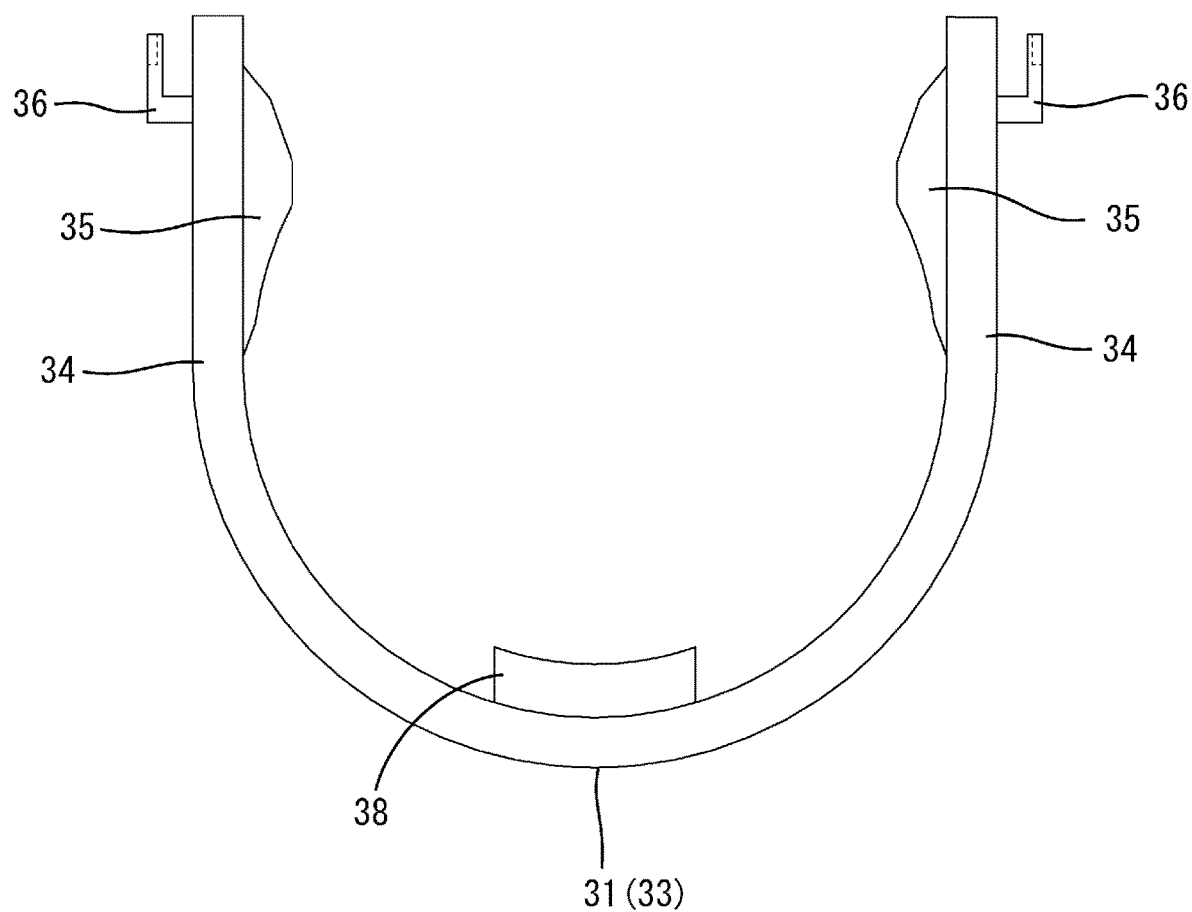
FIG. 9 is a front view of main parts of a body part of embodiment 1 of this invention.

As shown in FIG. 9, on the body-side wrapping part 33, a pair of side walls 34 is arranged that stands upward substantially vertically from the right and left end parts of the lower half part. At a position close to the end parts of the inner surface of both of the side walls 34, a pair of body-side regulating parts 35 having the same height is protrudingly arranged. The body-side regulating parts 35, extending in a vertical direction, are plate-shaped and have an arc shape in which a downwardly sloping side part is substantially continuous with the inner surface of the semicircular arc shape of the lower half part.

Figure 2:
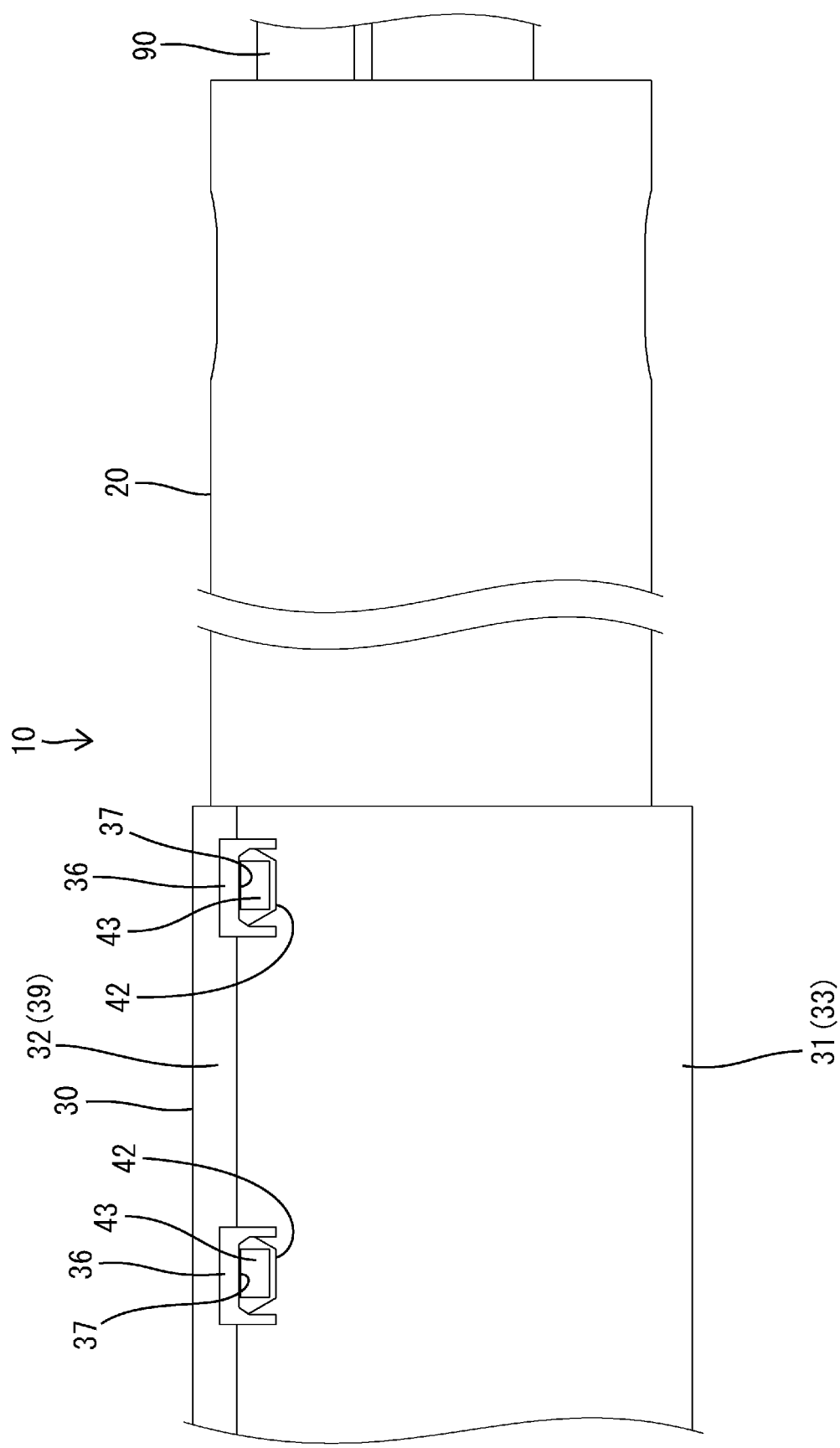
FIG. 2 is a side view of main parts of the wire protection member of embodiment 1 of this invention.
Figure 3:
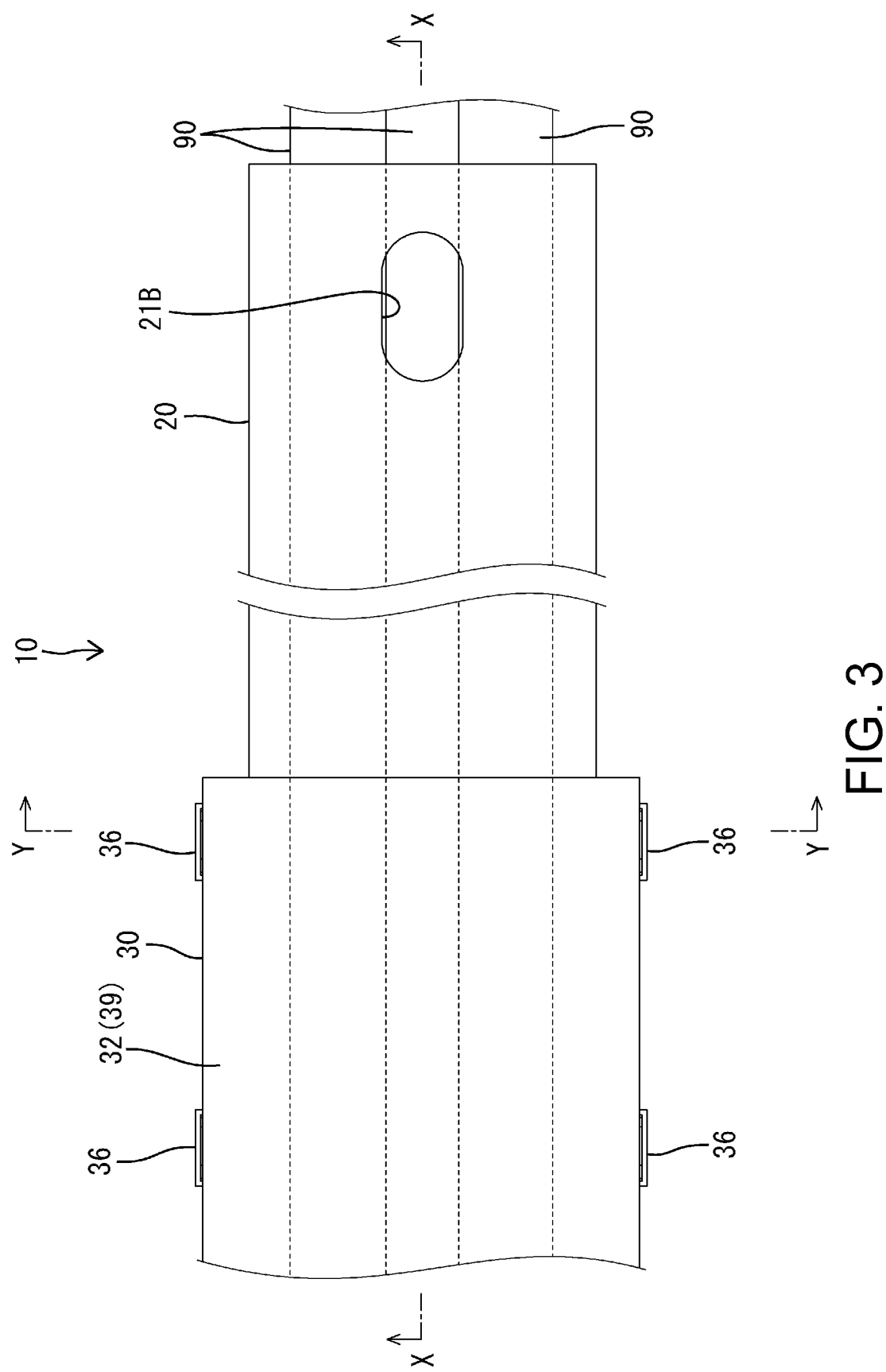
FIG. 3 is a plan view of main parts of the wire protection member of embodiment 1 of this invention.
Figure 4:
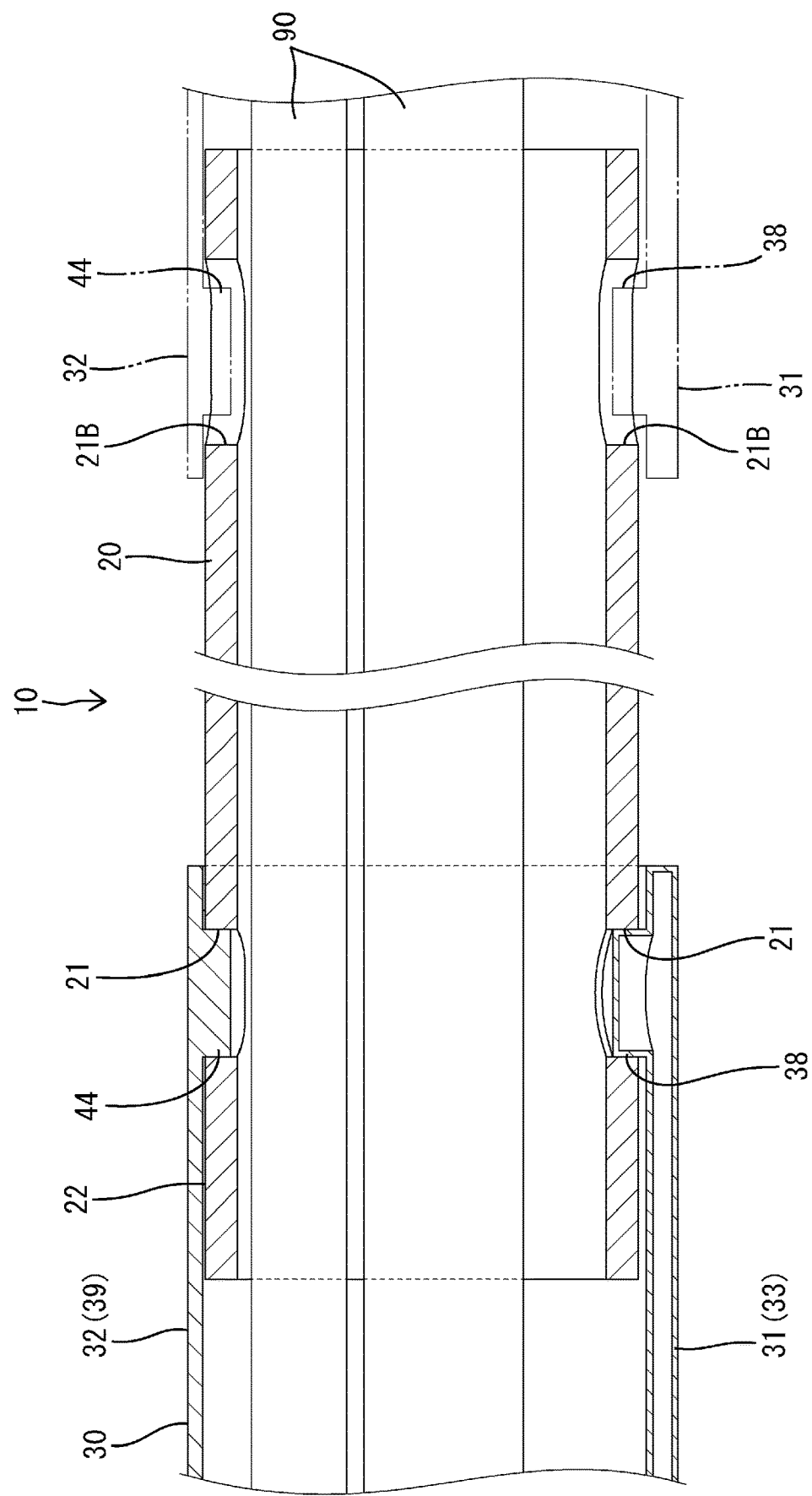
FIG. 4 is a cross-sectional view taken along line X-X of FIG. 3.
Figure 10:
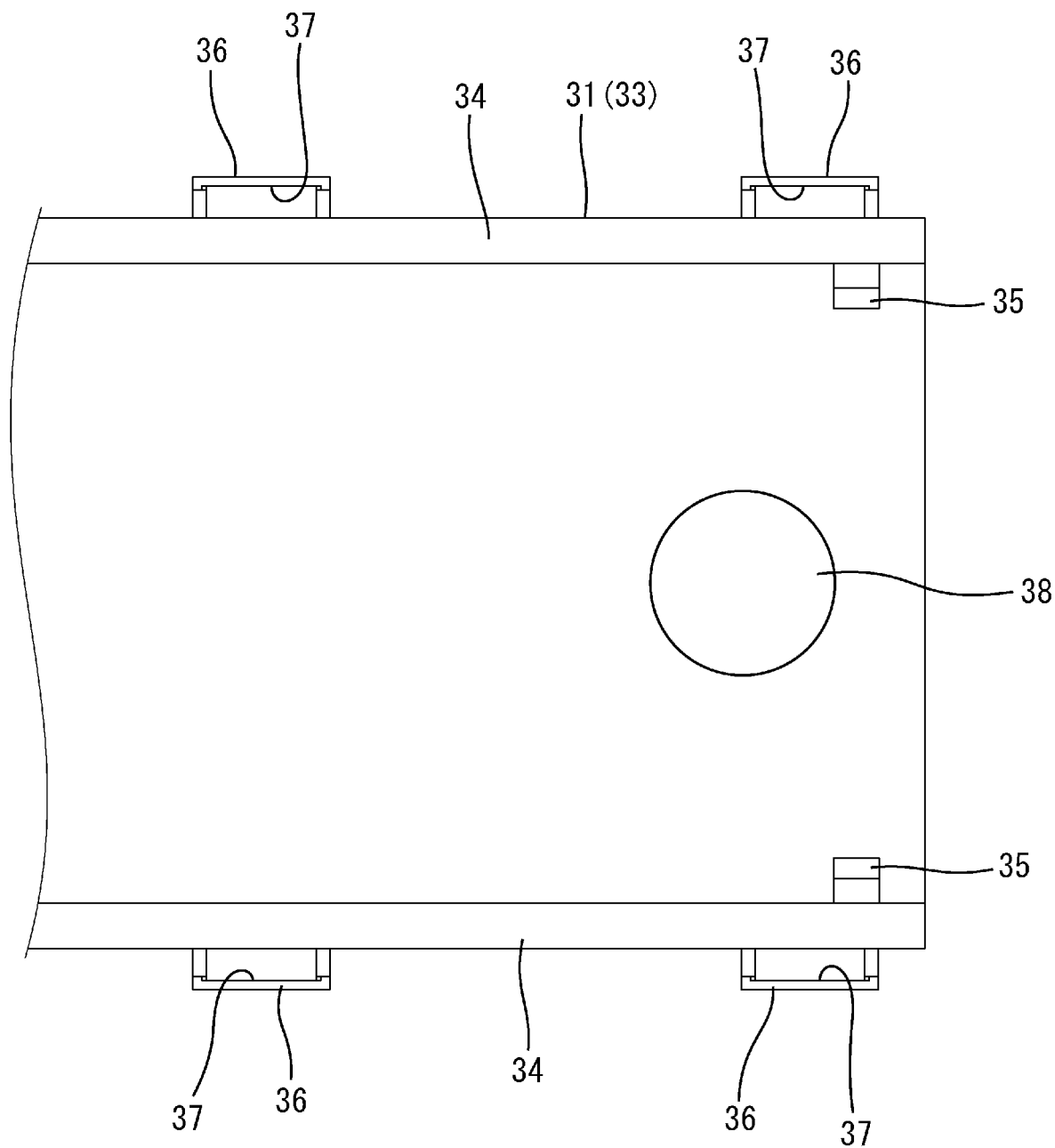
FIG. 10 is a plan view of main parts of the body part of embodiment 1 of this invention.

As shown in FIGS. 2 and 10, at upper outer surfaces of both side walls 34 of the body-side wrapping part 33, there is arranged a pair of body-side locking parts 36, spaced apart at both sides in the axial direction. As shown in FIG. 9, the body-side locking parts 36 (*i*) have substantially an L shape, as seen from a front view, that projects sideways, substantially horizontally, from the outer surface of the side walls 34 and then stands substantially perpendicularly and (ii) can be bent and deformed inward and outward, with connection points (proximal end points) with the outer surface of the side walls 34 as fulcrums. The body-side locking parts 36 are provided with locking holes 37 which penetrate through in a vertical direction and which open to the sides at the lower parts.

As shown in FIGS. 9 and 10, at an inner peripheral surface (upper surface) of the body-side wrapping part 33, at a right/left center portion that becomes the lowest part and at a position close to an edge, a body-side protrusion 38 is protrudingly arranged as a protector-side locking part. The body-side protrusion 38 has a flat pedestal shape with a circular cross section. An upper surface (tip end surface in a protruding direction) of the body-side protrusion 38 is formed in an arc shape having the same curvature as the inner surface of the lower half part of the body-side wrapping part 33. The body-side protrusion 38 can be fit in the hole 21 of the pipe 20 substantially without any gap. A protrusion dimension of the body-side protrusion 38 is made to be slightly smaller than a thickness of the peripheral wall of the pipe 20.

Figure 6:
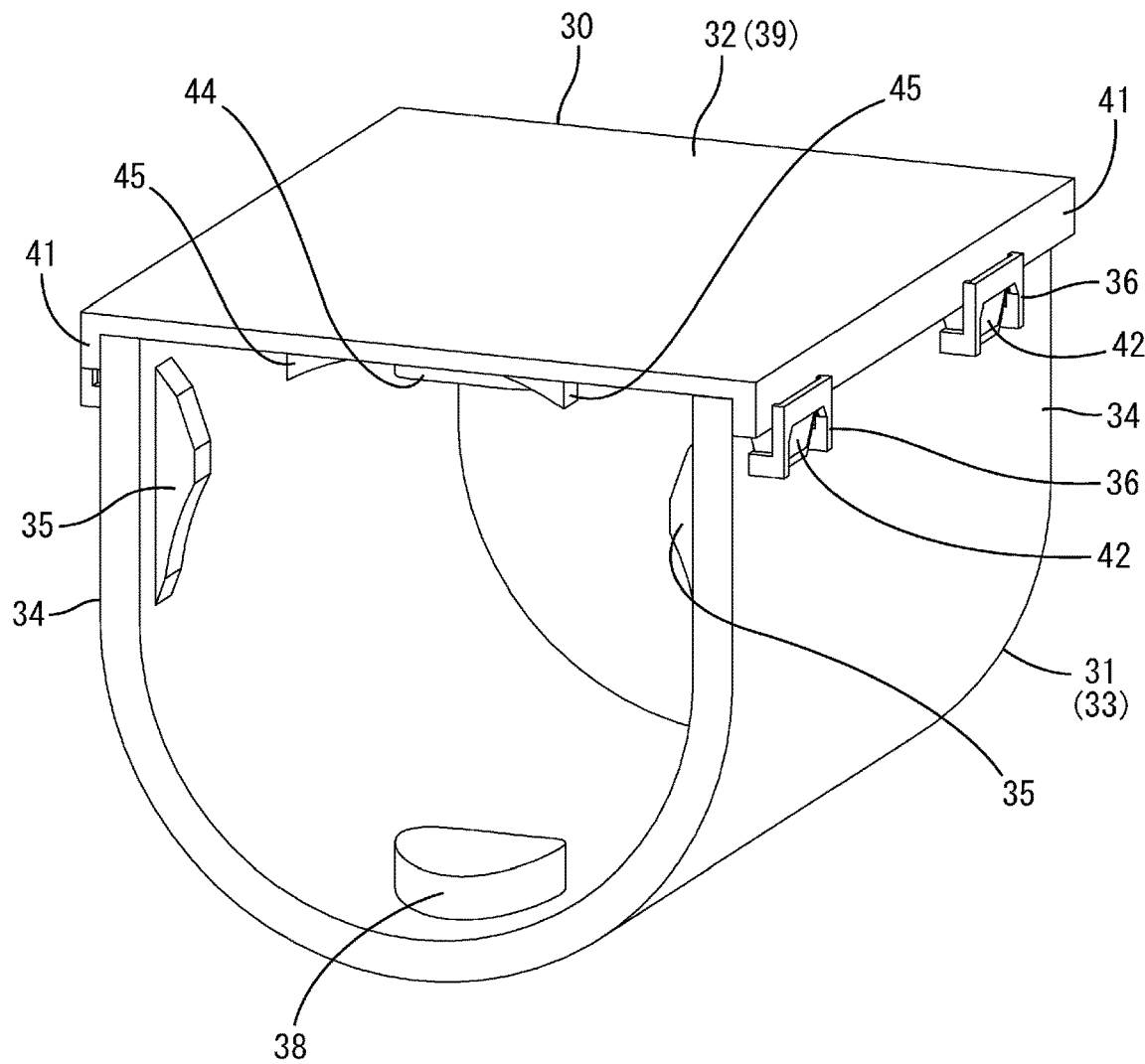
FIG. 6 is a perspective view of main parts of a protector of embodiment 1 of this invention.
Figure 7:
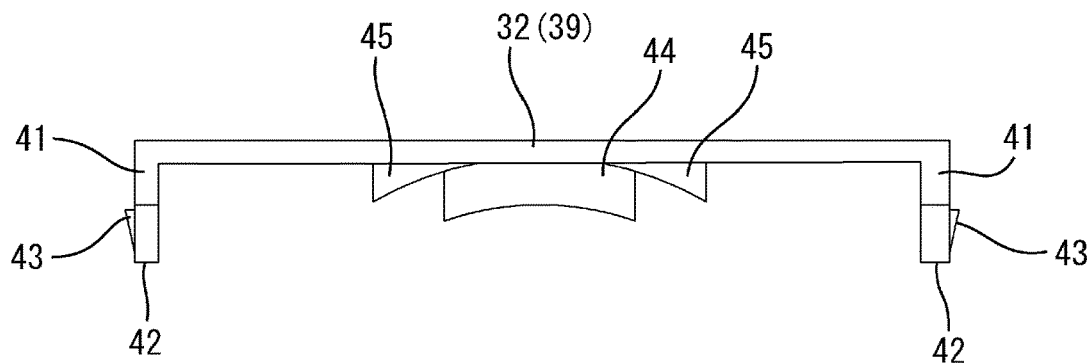
FIG. 7 is a front view of main parts of a cover part of embodiment 1 of this invention.
Figure 8:
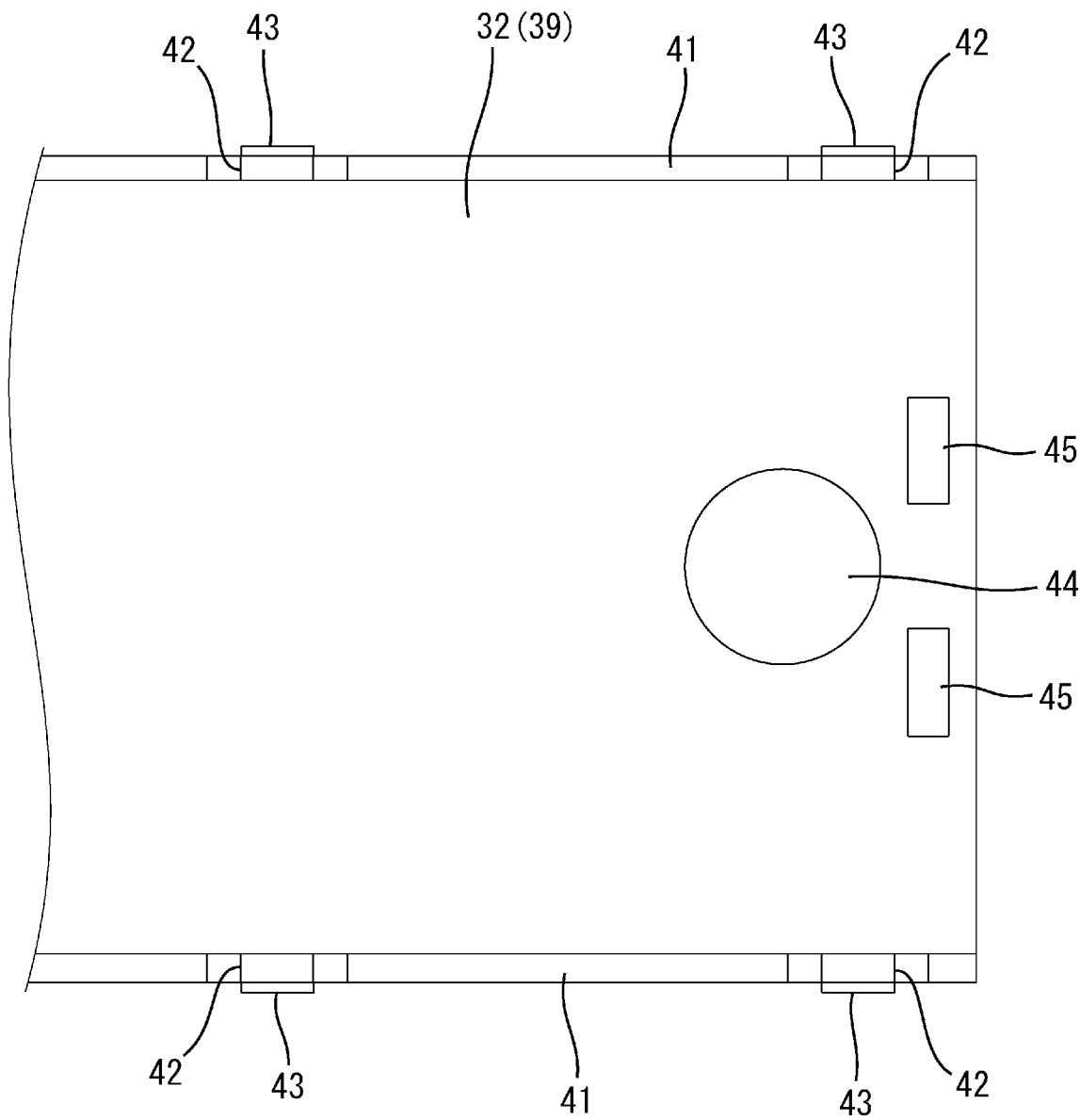
FIG. 8 is a bottom view of main parts of the cover part of embodiment 1 of this invention.

The cover part 32 has a cover-side wrapping part 39 that has a horizontal plate shape and can cover the wrapping area 22 of the pipe 20 from above. The cover-side wrapping part 39 has a substantially rectangular shape as seen from a plan view and is configured in a size that can close an upper surface opening of the body-side wrapping part 33. As shown in FIGS. 7 and 8, at both right and left sides of the cover-side wrapping part 39, there is arranged a pair of side edge parts 41 that each project downward over the entire length in the axial direction. As shown in FIG. 6, both of the side edge parts 41 are arranged so as to cover upper end parts of both of the side walls 34 of the body-side wrapping part 33 from both sides and serve to restrict positional deviation of the cover-side wrapping part 39 in a horizontal direction with respect to the body-side wrapping part 33.

At the lower end parts of both of the side edges 41, a pair of cover-side locking parts 42 is protrudingly arranged, the cover-side locking parts 42 being spaced part in the axial direction. The cover-side locking parts 42 have a rectangular plate shape, and nail-shaped locking protrusions 43 are protrudingly arranged on outer surfaces. As shown in FIG. 2, the locking protrusions 43 can be fit in the locking holes 37 of the body-side locking parts 36.

As shown in FIGS. 7 and 8, at the lower surface of the cover-side wrapping part 39, at the right/left center portion and at a position close to the edge, a cover-side protrusion 44 is protrudingly arranged as a protector-side locking part. In the same manner as the body-side protrusion 38, the cover-side protrusion 44 has a flat pedestal shape with a circular cross section. As shown in FIG. 5, a lower surface of the cover-side protrusion 44 has an arc shape symmetrical to an upper surface of the body-side protrusion 38. Additionally, in the same manner as in the body-side protrusion 38, a protrusion dimension of the cover-side protrusion 44 is slightly smaller than a thickness of the peripheral wall of the pipe 20.

At the lower surface of the cover-side wrapping part 39, cover-side restricting parts 45 are protrudingly arranged closer to an edge of the cover-side wrapping part 39 than the cover-side protrusion 44. The cover-side restricting parts 45 have a plate shape that extends in the horizontal direction and in which the center part is divided. The lower surfaces of the cover-side restricting parts 45 curve with the same curvature as the lower surface of the cover-side protrusion 44.

Next, an assembly structure of the wire protection member 10 of this embodiment 1 is explained. At the time of assembling, a plurality of wires 90 is inserted through the pipe 20 and is routed along the inner surface of the body parts 31. At the front and rear of the pipe 20, the body-side wrapping parts 33 are fit around the wrapping areas 22 of the pipe 20. Then, the lower half part of the pipe 20 is arranged along the inner surfaces of the lower half parts of the body-side wrapping parts 33, and the body-side protrusion 38 of each body-side wrapping part 33 is inserted from below into the respective hole 21 at the lower half side of the pipe 20 in a fitted state (see FIGS. 4 and 5). The body-side protrusions 38 are inserted into the holes 21 so as to be able to contact the hole edges of the holes 21, whereby the body parts 31 are restricted from positional deviation in the axial direction and in the circumferential direction with respect to the pipe 20. At this time, the tip end parts of the body-side protrusions 38 do not reach the inside of the pipe 20 and do not contact each of the wires 90. Additionally, the side surface parts of the body-side restricting parts 35 are arranged so as to be able to contact the upper half part of the pipe 20 from both the right and left sides, and the pipe 20 is restricted from being removed from the body-side wrapping parts 33.

Next, the cover parts 32 are placed on the body parts 31 from above. As the upper surface openings of the body parts 31 are closed by the cover parts 32, the locking protrusions 43 of the respective cover-side locking parts 42 are elastically fit and engaged to the locking holes 37 of the corresponding body-side locking parts 36, and the cover parts 32 are held together with the body parts 31 (see FIG. 2).

Furthermore, when the cover parts 32 are held together with the body parts 31, the cover-side protrusions 44 of the cover-side wrappings part 39 are inserted into the hole 21 at the upper half part side of the pipe 20 from above in a fitted state, and the cover parts 32 are restricted from positional deviation in the axial direction and in the horizontal direction with respect to the pipe 20 (see FIG. 5). Additionally, the lower surface parts of the cover-side restricting parts 45 are arranged so as to be able to contact along the outer peripheral surface of the upper half part of the pipe 20.

Thus, the body parts 31 and the cover parts 32 are connected to each other such that they are restricted from being separated from each other, forming the protectors 30. Additionally, when the body parts 31 and the cover parts 32 are connected to each other, the wrapping areas 22 of the pipe 20 are held between the body parts 31 and the cover parts 32, and the body-side protrusions 38 and the cover-side protrusions 44 are fittingly inserted into the corresponding holes 21 in a vertical direction. Thus, the protectors 30 are fixed to the pipe 20 in a state in which their position is determined.

After that, the wire protection members 10 are arranged along the surface under the floor of the vehicle and are mounted to the vehicle via undepicted mounting parts. At this time, the flat upper surface of the cover parts 32 is arranged along and in close contact with the surface under the floor of the vehicle and is arranged substantially parallel to the surface under the floor of the vehicle. Thus, the flat upper surface of the cover part 32 can be installed at the surface under the floor of the vehicle in a state in which the protector 30 is stabilized. At the same time, a large wire insertion space inside of the protector 30 can be ensured.

As explained above, according to this embodiment 1, the protectors 30 each have the body part 31 and the cover part 32, and each of the wires 90 is aligned along the body part 31. In this state, the cover parts 32 can be connected to the body parts 31. Thus, an operation is not needed in which each of the wires 90 is inserted into the protectors 30, and assembly workability is excellent.

Additionally, when the cover parts 32 are connected to the body parts 31, the wrapping areas 22 of the pipe 20 are held between the body parts 31 and the cover parts 32, the body-side protrusions 38 and the cover-side protrusions 44 as the protector-side locking parts are fit in the holes 21 as the corresponding pipe-side locking parts in a vertical direction (a direction intersecting the axial direction), and the protectors 30 are maintained in a state of being restricted from positional deviation in the circumferential direction and in the axial direction with respect to the pipe 20. Thus, even if there is no special complex connecting structure provided as a positional deviation restriction means on the pipe 20 and the protector 30, the protector 30 can be reliably connected to the pipe 20.

Furthermore, the pipe-side locking parts are merely arranged as the holes 21, so the extrusion molded body of the pipe 20 can be formed without any problem.

Additionally, the body-side protrusions 38 and the cover-side protrusions 44 as the protector-side locking parts are arranged at both the body part 31 and the cover part 32. Thus, the protector 30 is reliably connected to the pipe 20.

Furthermore, at both end parts, in the axial direction, of (i) each body-side wrapping part 33 and (ii) each cover-side wrapping part 39 that overlap the wrapping area 22 of the pipe 20, the body-side locking parts 36 and the cover-side locking parts 42 are arranged, which maintain a state in which the body part 31 and the cover part 32 are connected to each other. Thus, even if a foreign substance or the like interferes and large stress is generated at the body-side wrapping part 33 and the cover-side wrapping part 39, the body-side locking parts 36 and the cover-side locking parts 42 can resist the stress, and positional deviation of the protector 30 with respect to the pipe 20 can be more effectively restricted.

Furthermore, the pipe-side locking parts are the holes 21 and 21B that pass through the peripheral wall of the pipe 20, and the holes 21 and 21B are arranged at respective end parts of the pipe 20 in the axial direction. One hole 21B of the holes 21 and 21B arranged at the respective ends in the axial direction is an elongated hole that is elongated in the axial direction and has a shape that can loosely fit the body-side protrusion 38 and the cover-side protrusion 44 with respect to the axial direction. Thus, when the protectors 30 are connected to the respective end parts of the pipe 20 in the axial direction, even if there is an assembly error between the protector 30 and the pipe 20 in the axial direction, the body-side protrusion 38 and the cover-side protrusion 44 can be loosely fit to one of the holes 21B in the axial direction (see FIG. 4). Thus, an assembly error between the protector 30 and the pipe 20 can be absorbed, and the body-side protrusions 38 and the cover-side protrusions 44 can be reliably fit to the holes 21 and 21B, respectively.

Reference Example

FIGS. 12-20 show a wire protection member 10A of a reference example of this invention. In the reference example, a connection structure of a pipe 20A and a protector 30A, is different from that of embodiment 1. Regarding (i) the pipe 20A being of synthetic resin and being an extrusion molded body and (ii) the protector 30A being of synthetic resin and formed by a body part 31A and a cover part 32A, this embodiment is the same as embodiment 1.

Figure 13:
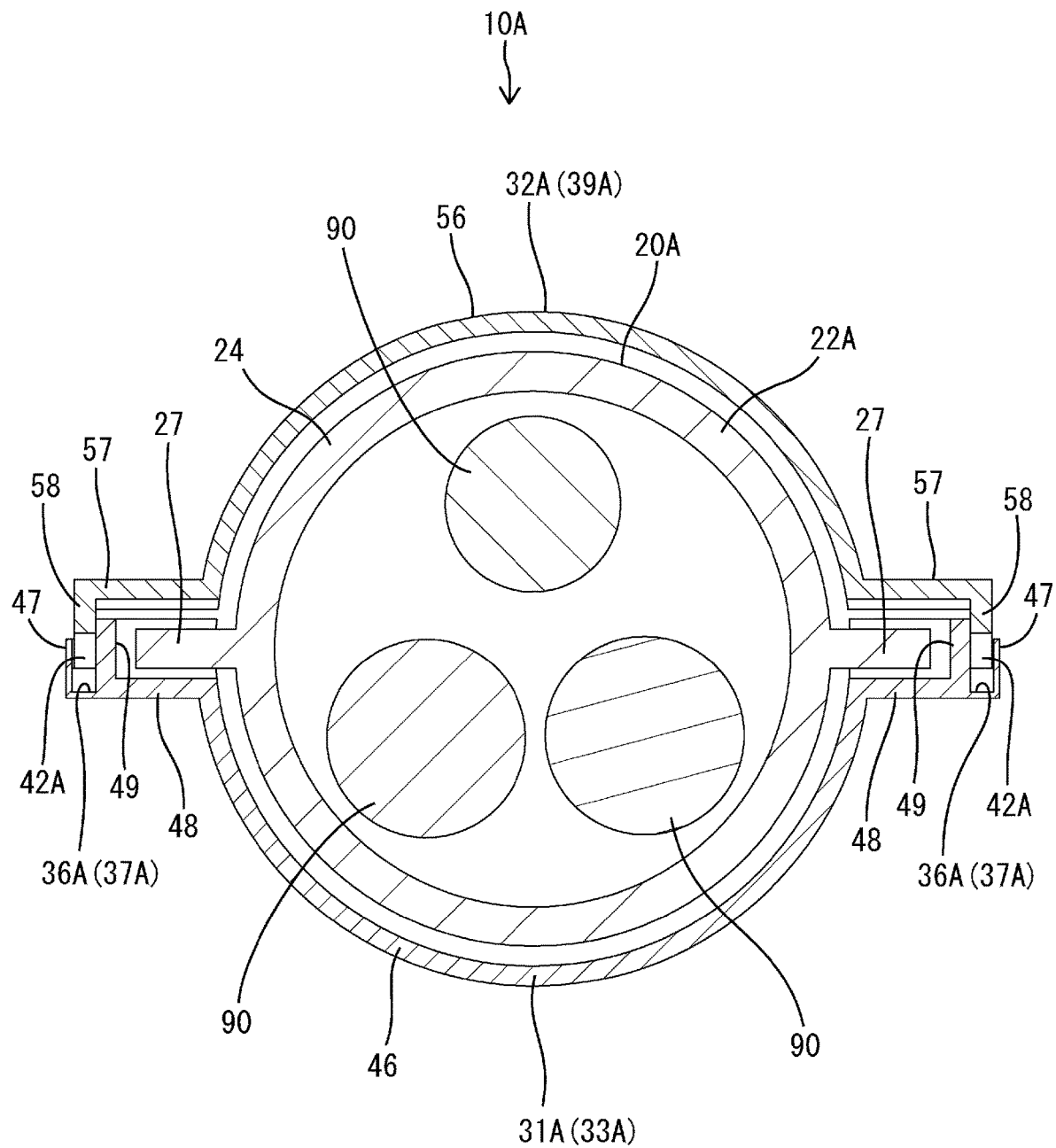
FIG. 13 is a view, corresponding to FIG. 5, of the wire protection member of a reference example.
Figure 14:
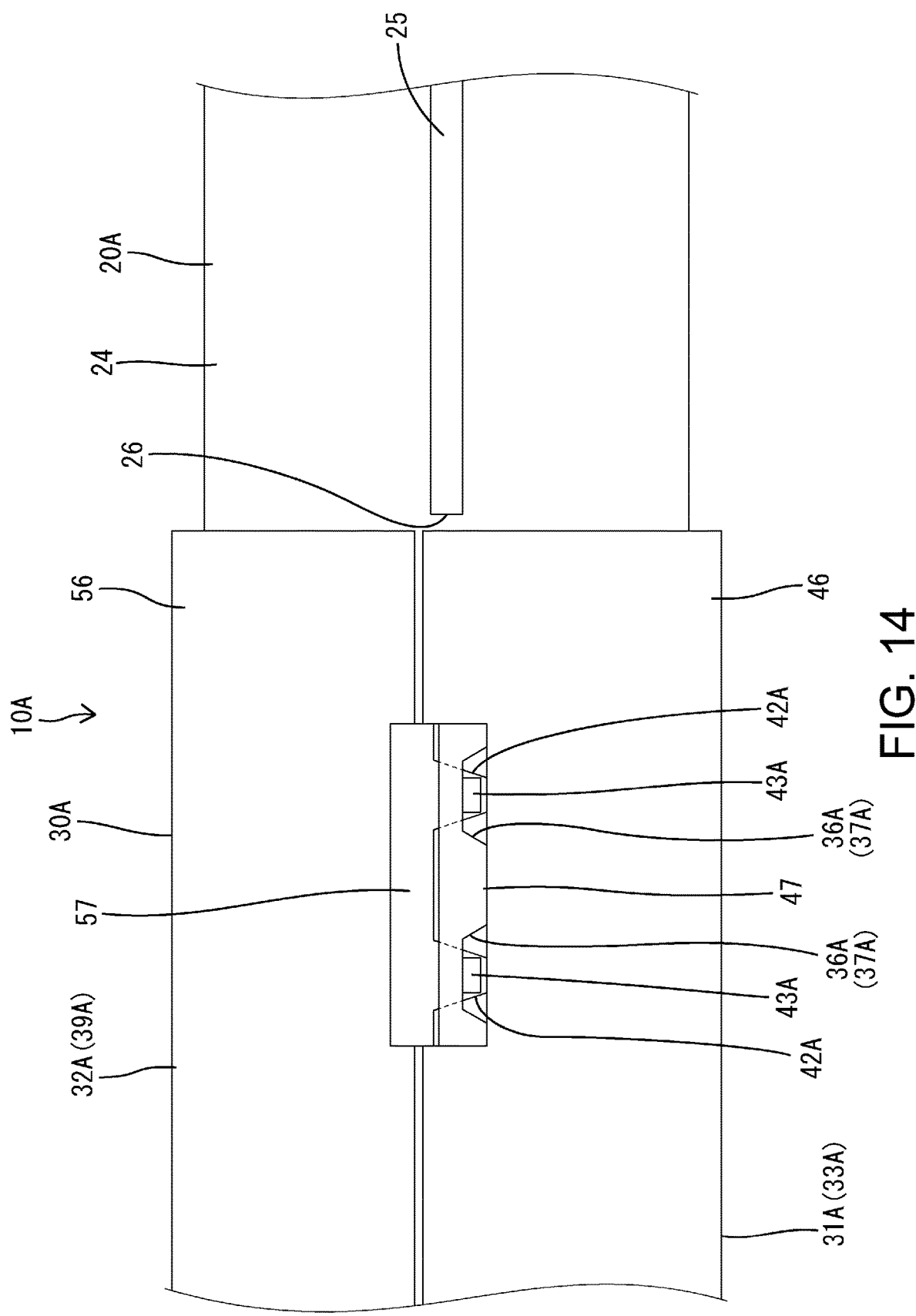
FIG. 14 is a side view of main parts of the wire protection member of a reference example.
Figure 15:
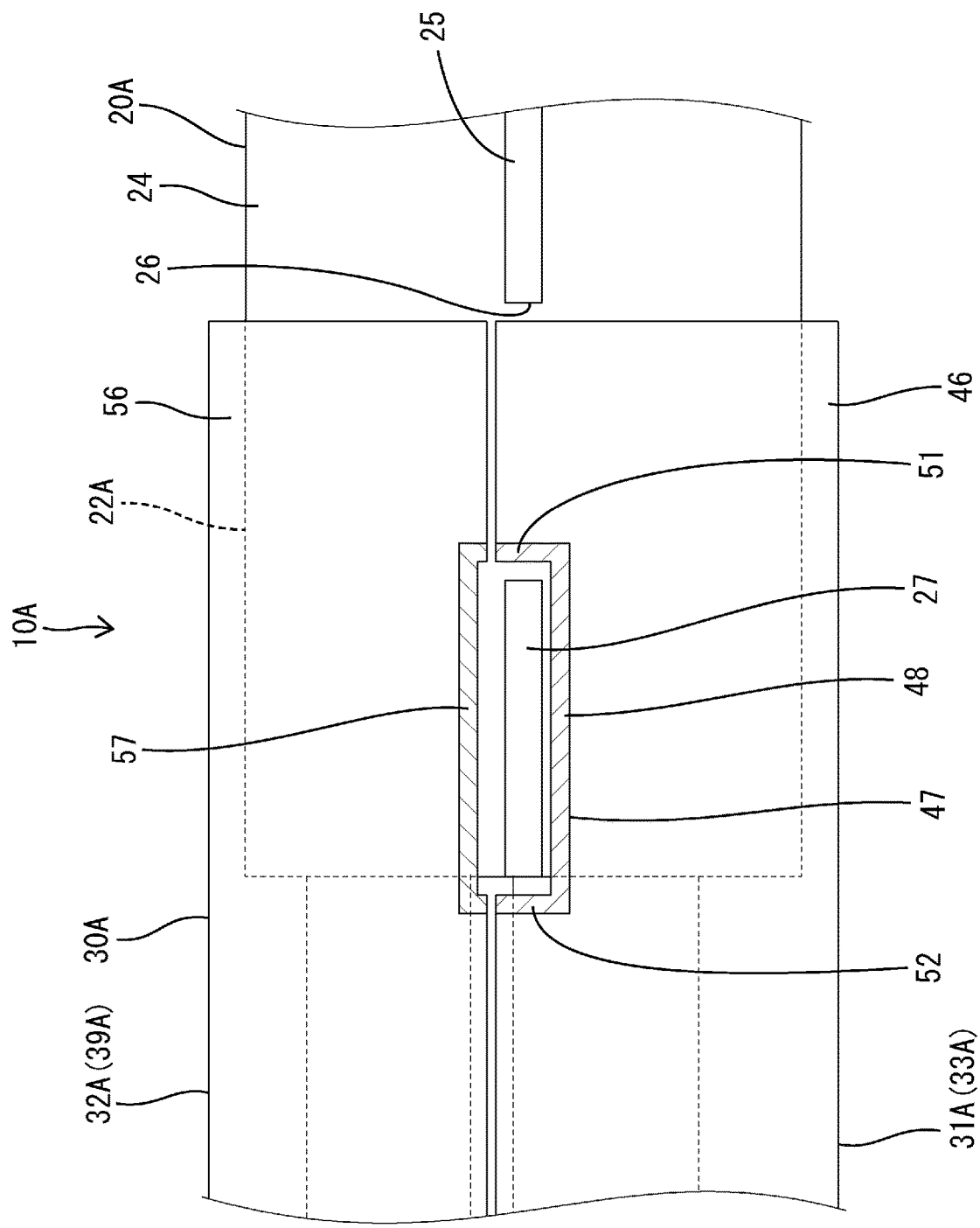
FIG. 15 is a partially broken side view of main parts of the wire protection member of a reference example.
Figure 20:
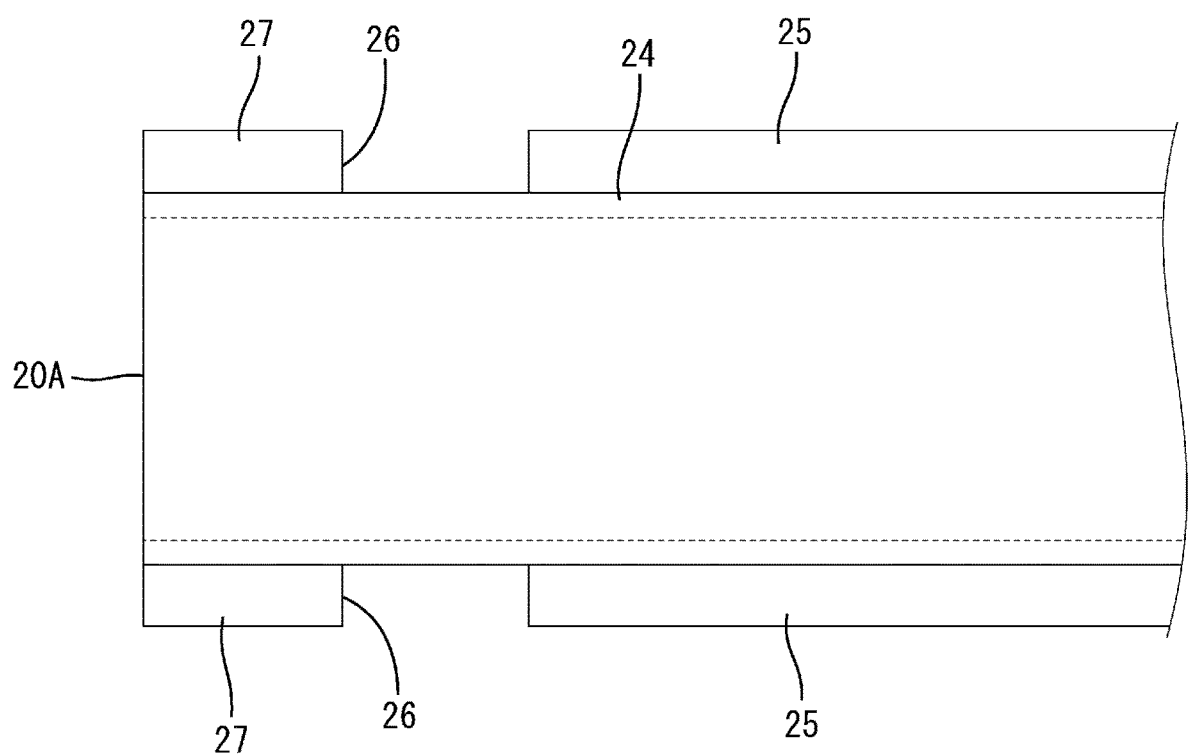
FIG. 20 is a front view of main parts of a pipe of a reference example.

As shown in FIGS. 13 and 20, the pipe 20A is constituted by (i) a pipe body 24 having a substantially circular cross section and extending in a straight tubular shape and (ii) a pair of protrusions 25, the protrusions 25 extending from both ends, in a diameter direction, of a center, in a height direction of the pipe body 24, to both sides in a horizontal direction. The protrusions 25 have a horizontal plate shape that extends in the axial direction, have a specified extension dimension over the entire length in the axial direction (excluding spaces 26 that will be mentioned later) and are formed by extrusion molding. Each of the protrusions 25 is broken up via a space 26 at the wrapping area 22 at both end parts of the pipe 20A in the axial direction and is provided with a protruding locking part 27 as a pipe-side locking part at a specified range from a tip end part of the pipe 20A to the space 26.

Figure 18:
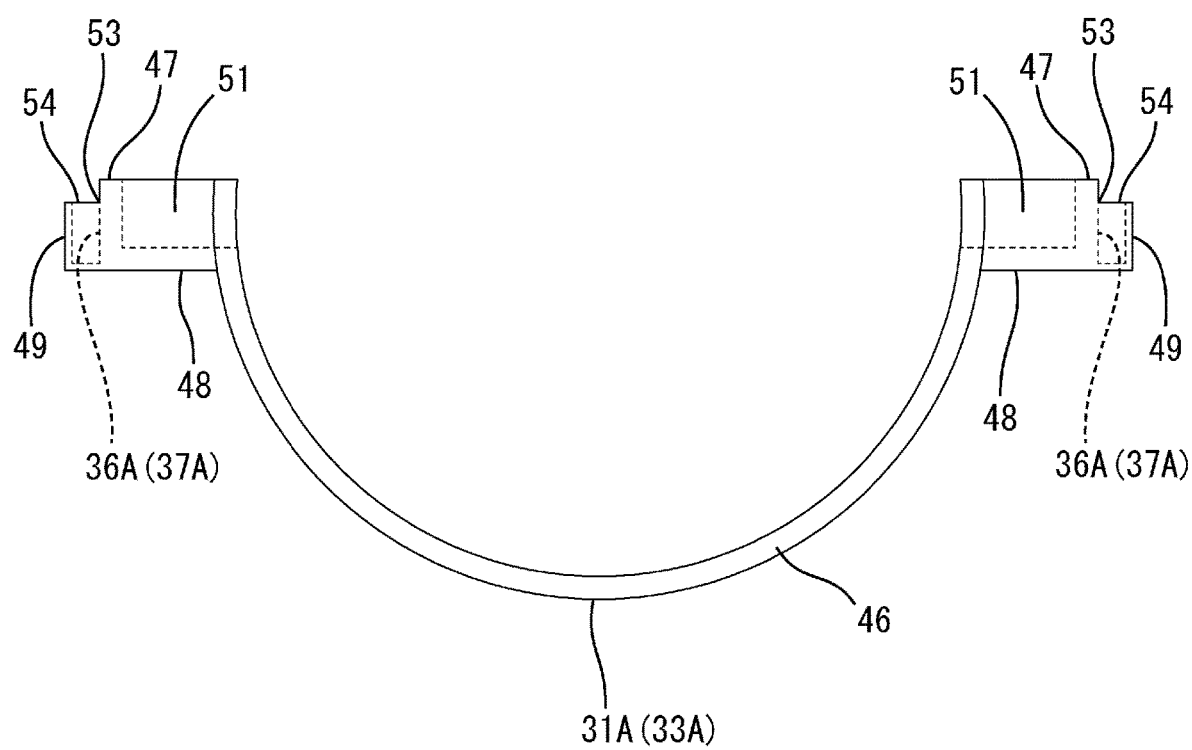
FIG. 18 is a front view of main parts of a body part of a reference example.
Figure 19:
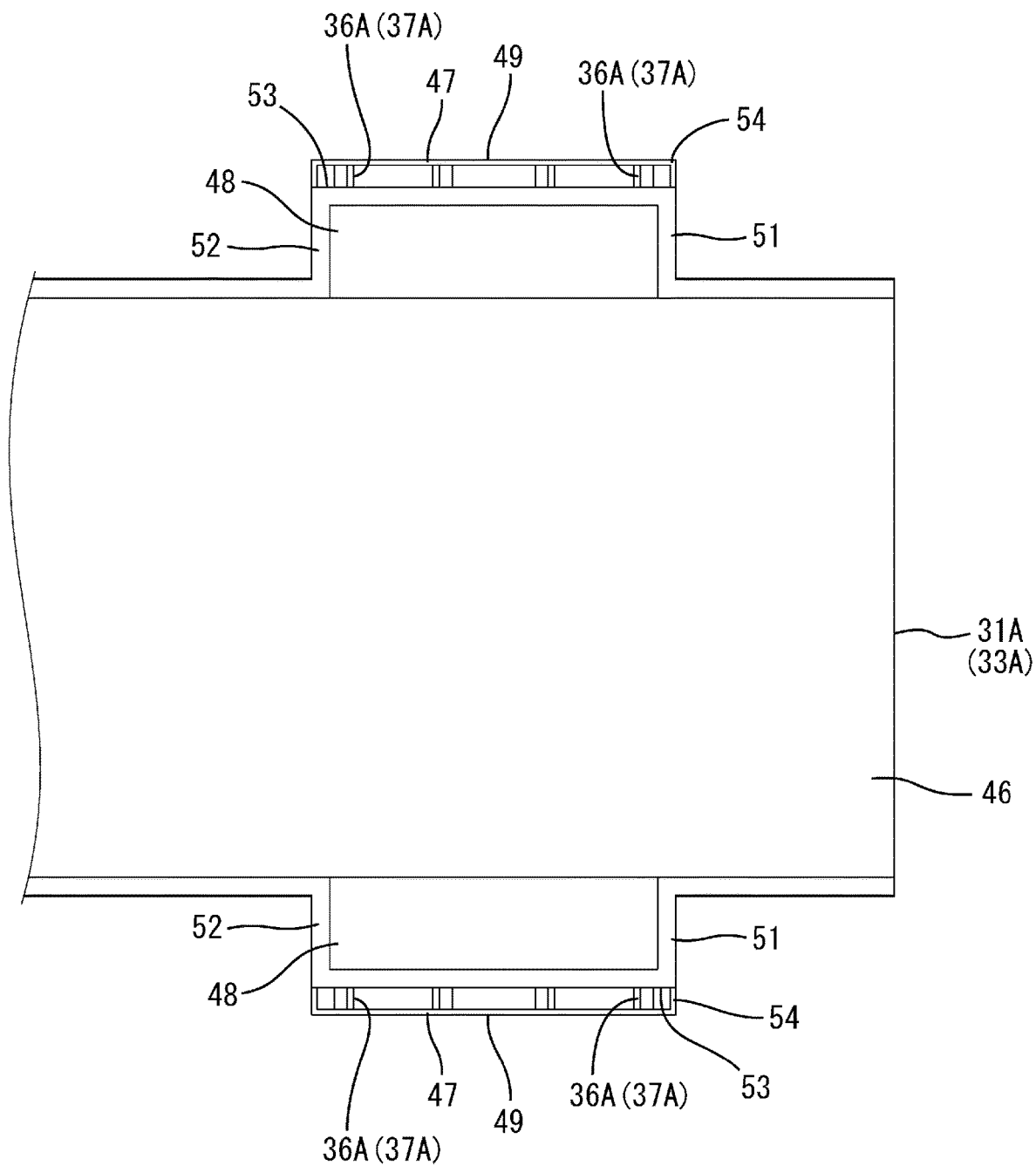
FIG. 19 is a plan view of main parts of the body part of a reference example.

The body part 31A has a body-side wrapping part 33A that is externally fit to the lower half part of the wrapping area 22A of the pipe 20A. The body-side wrapping part 33A has a body-side receiving part 46 whose cross section is semi-circular and which is arranged along an outer peripheral surface of the lower half part of the pipe 20A. As shown in FIGS. 18 and 19, at the center, in the axial direction, of respective upper end sides (both end sides in the circumferential direction) of the body-side receiving part 46, receptors 47 are protrudingly arranged as protector-side locking parts at the respective right and left sides. Each of the receptors 47 has a square box shape that opens upward and inward and is defined by a bottom surface part 48, a side surface part 49, a front surface part 51, and a rear surface part 52. Steps 53 are arranged at a position(s) along a thickness direction at an upper end part of the respective side surface parts 49, each forming a stepped surface 54 in which the outer area of the step 53 has dropped one step from the inner area. At each of the side surface parts 49, locking holes 37A are formed as body-side locking parts 36A that (i) vertically extend and open to the respective stepped surfaces 54 and (ii) open downward. The locking holes 37A are arranged at both sides of the side surface part 49 in the axial direction (at front and back).

Figure 16:
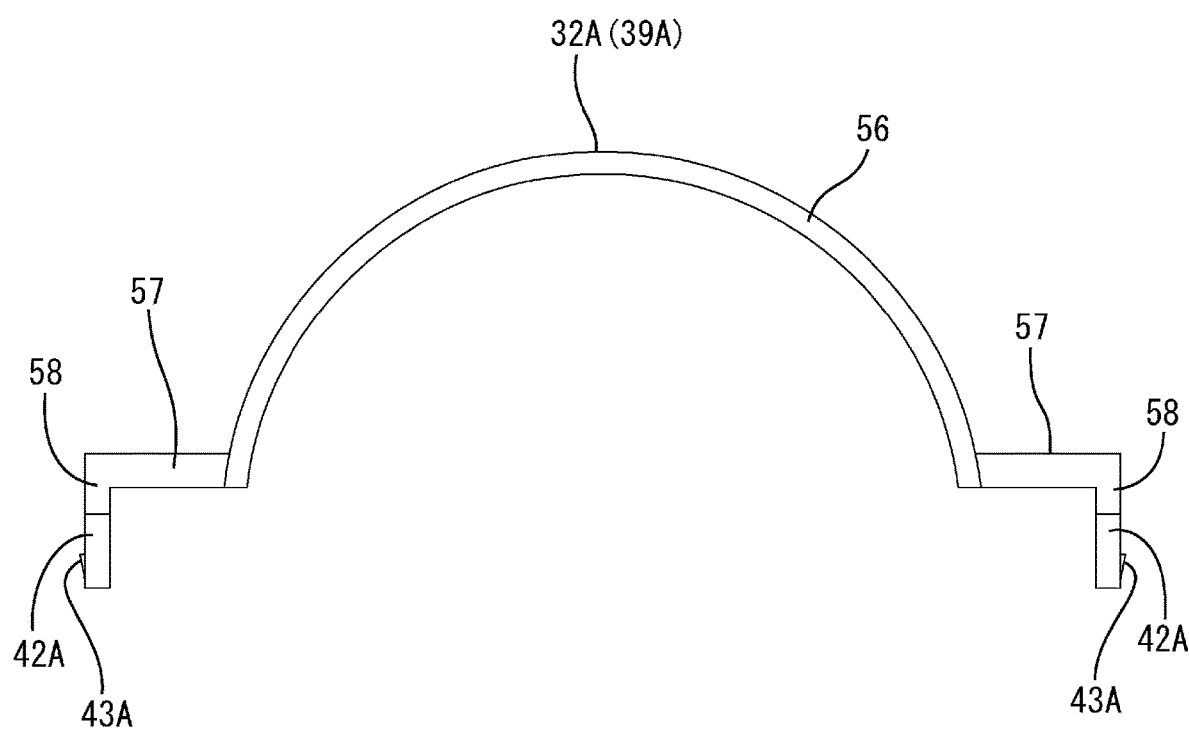
FIG. 16 is a front view of main parts of a cover part of the wire protection member of a reference example.
Figure 17:
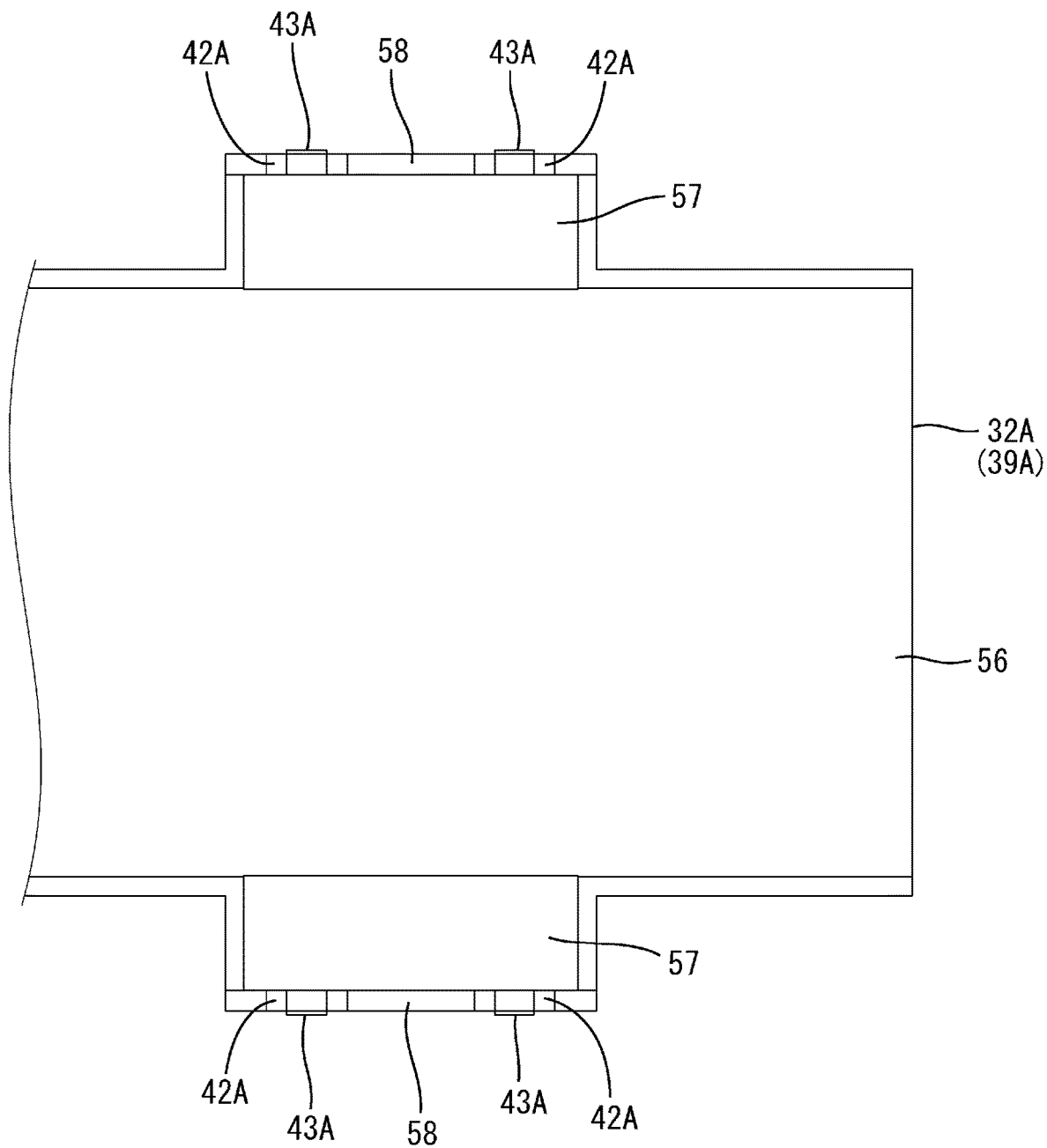
FIG. 17 is a bottom view of main parts of the cover part of the wire protection member of a reference example.

The cover part 32A has a cover-side wrapping part 39A that is externally fit to the upper half part of the wrapping area 22A of the pipe 20A. The cover-side wrapping part 39A has a cover-side receiving part 56 whose cross section is semi-circular and which is arranged along the outer peripheral surface of the upper half part of the pipe 20A. As shown in FIGS. 16 and 17, at the center, in the axial direction, of both lower end sides of the cover-side receiving part 56, projecting parts 57 are overhangingly arranged at the respective right and left sides. At the tip end parts of the projecting parts 57, projecting pieces 58 are protrudingly arranged downward over the entire length, in the axial direction. Furthermore, from both sides, in the axial direction, of the lower end parts of the projecting pieces 58, cover-side locking parts 42A are arranged protruding downward. Claw-shaped locking projections 43A are protrudingly arranged at the outer surfaces of the cover-side locking parts 42A.

Next, an assembly structure of the wire protection member 10A of the reference example is explained. When the wire protection member 10A is assembled, a plurality of wires 90 is inserted through the pipe 20A and is arranged along the inner surface of the body part 31A. The body-side wrapping part 33A is externally fit to the wrapping area 22A of the pipe 20A. At this point, the lower half part of the wrapping area 22A of the pipe 20A is arranged along the inner surface of the body-side receiving part 46, and the protruding locking parts 27 of the pipe 20A are inserted into the receptors 47 from above in a fitted state. At this time, the front surface parts 51 of the receptors 47 enter the spaces 26 so as not to interfere with the protrusions 25, and are released. Additionally, the protruding locking parts 27 are arranged so as to be able to contact the front surface parts 51 and the rear surface parts 52 of the receptors 47, whereby the body part 31A is restricted from positional deviation in the axial direction with respect to the pipe 20A (see FIG. 15). Additionally, the protruding locking parts 27 are arranged so as to be able to contact the bottom surface parts 48 of the receptors 47, whereby the body part 31A is restricted from positional deviation in the circumferential direction with respect to the pipe 20A.

Subsequently, the cover part 32A covers the body part 31A and is attached to the body part 31A from above. At this point, the cover-side receiving part 56 covers the upper half part of the wrapping area 22A of the pipe 20A. The projecting parts 57 are mountingly supported by the respective upper end parts of the side surface parts 49 of the receptors 47, the front surface parts 51, and the rear surface parts 52. The lower end parts of the projecting pieces 58 are arranged so as to be able to contact the stepped surfaces 54 of the side surface parts 49 (see FIG. 12). Thus, the cover part 32A is restricted from positional deviation in the horizontal direction with respect to the body part 31A. Additionally, the respective cover-side locking parts 42A are inserted into the corresponding locking holes 37A, and the locking projections 43A are elastically locked to hole edges of the locking holes 37A at the side surface parts 49 (see FIG. 14). Thus, the body part 31A and the cover part 32A are connected such that they are restricted from being separated from each other, the protector 30A is formed, and the wrapping area 22A of the pipe 20A is held between the body part 31A and the cover part 32A. Additionally, the protruding locking parts 27 are lockingly inserted into the receptors 47, whereby the protector 30A is fixed to the pipe 20A in a position-determined state.

After that, the wire protection member 10A is arranged along the surface under the floor of an undepicted vehicle and is mounted to the vehicle via an undepicted mounting part. At this time, the upper surfaces (plate surfaces) of the protrusions 25 of the pipe 20A are arranged substantially parallel to the surface under the floor of the vehicle.

According to the reference example, when the cover part 32A is connected to the body part 31A, the protruding locking parts 27 as corresponding pipe-side locking parts are fit to the receptors 47 as the protector-side locking parts in the vertical direction (in the direction intersecting the axial direction). The protector 30A is restricted from positional deviation in the circumferential direction and in the axial direction with respect to the pipe 20A, whereby the protector 30A can be reliably connected to the pipe 20A. Additionally, the locking holes 37A as the body-side locking parts 36A are also arranged at the receptors 47, so spatial efficiency is excellent.

Other Embodiments

The following briefly explains other embodiments.

(1) The protector-side locking part may be arranged at only one of the body part or the cover part.

(2) In a state in which the protector-side locking part(s) is fit to the pipe-side locking part(s) from a direction intersecting the axial direction, the protector may be able to tolerate some displacement in the axial direction and in the circumferential direction with respect to the pipe.

(3) The pipe may be a metal tube, or a composite tube in which a metal layer and a resin layer are layered in a thickness direction (diameter direction).

(4) The pipe may be bent at a position(s) along the axial direction.

(5) The cross-sectional shape of the pipe may be oval or substantially oval, or may be substantially rectangular.

EXPLANATION OF SYMBOLS 10, 10A Wire protection members
20, 20A Pipes
21, 21B Holes (pipe-side locking parts)
27 Protruding locking parts
30, 30A Protectors
31, 31A Body parts
32, 32A Cover parts
36, 36A Body-side locking parts (locking parts)
38 Body-side protrusion (protector-side locking part)
42, 42A Cover-side locking parts (locking parts)
44 Cover-side protrusion (protector-side locking part)
47 Receptors (protector-side locking parts)
90 Wires

What is claimed is:

1. A wire protection member comprising:
a pipe and a protector that define a routing pathway of a wire, wherein:
the protector has a body part and a cover part that are connected to each other in a vertical direction perpendicular to an axial direction of the pipe and cover an end part of the pipe,
a protector-side locking part is provided at least one of the body part or the cover part,
at the pipe, a pipe-side locking part is provided that (i) when the body part and the cover part are connected, fits together with the protector-side locking part from the direction intersecting the axial direction and (ii) restricts positional deviation of the protector in a circumferential direction of the pipe and in the axial direction of the pipe,
the pipe-side locking part comprises a hole that penetrates through a peripheral wall of the pipe, and
the protector-side locking part comprises a protrusion that fits into the hole, the protrusion inserting into the hole from the vertical direction, and the end part of the pipe being held between the body part and the cover part.

2. The wire protection member according to claim 1, wherein:
the pipe is an extrusion molded body made of resin.

3. The wire protection member according to claim 1, wherein:
the protector-side locking part is provided at both the body part and the cover part.

4. The wire protection member according to claim 1, wherein:
the protector includes a wrapping part that covers the end part of the pipe, and at each end, in the axial direction, of the wrapping part, the protector has a locking part that holds the body part and the cover part in a connected state.

5. The wire protection member according to claim 1, wherein:
the hole comprises a plurality of holes, each provided at a respective end part of the pipe in the axial direction, and one of the holes is formed as an elongated hole elongated in the axial direction and allows the protrusion to be loosely fit in the axial direction.

6. The wire protection member according to claim 1, wherein:
the protector is arranged at a surface under a floor of a vehicle, and the cover part is flat and is arranged along the surface under the floor.

7. A wire protection member comprising:
a pipe and protectors that define a routing pathway of the wire, wherein:
each protector has a body part and a cover part that are connected to each other from a direction intersecting an axial direction of the pipe and cover an end part of the pipe, and
protector-side locking parts are provided at at least one of each body part or each cover part,
at the pipe, pipe-side locking parts are provided that (i) when each body part and the respective cover part are connected, fit together with the protector-side locking parts from a direction intersecting the axial direction and (ii) restrict positional deviation of the protectors in a circumferential direction of the pipe and in the axial direction of the pipe,
each pipe-side locking part comprises a hole that passes through a peripheral wall of the pipe, and each protector-side locking part comprises a protrusion that is fit to the hole, and
the holes are arranged at respective end parts of the pipe in the axial direction, and one of the holes is formed in an elongated hole shape elongated in the axial direction, allowing the respective protrusion to be loosely fit in the axial direction.

8. The wire protection member according to claim 7, wherein each body part and each cover part includes one of the protector-side locking parts; and
each end part of the pipe includes two of the holes, opposed to each other in a diameter direction of the pipe.

9. The wire protection member according to claim 1, wherein the protector-side locking part comprises two protector-side locking parts, one at the body part and one at the cover part; and the hole comprises two holes, opposed to each other in a diameter direction of the pipe.

\* \* \* \* \*